United States Patent [19]
Little

[11] Patent Number: 5,644,502
[45] Date of Patent: Jul. 1, 1997

[54] METHOD FOR EFFICIENT COUNTER-CURRENT HEAT EXCHANGE USING OPTIMIZED MIXTURES

[75] Inventor: William A. Little, Palo Alto, Calif.

[73] Assignee: MMR Technologies, Inc., Mountain View, Calif.

[21] Appl. No.: 434,596

[22] Filed: May 4, 1995

[51] Int. Cl.$^6$ ........................................... C09K 5/00
[52] U.S. Cl. ..................... 364/496; 252/67; 252/71; 165/97
[58] Field of Search ..................... 364/496; 62/114, 62/335, 600, 610, 612, 614, 51.2, 102; 252/67, 71; 505/888, 896, 899; 165/97, 1

[56] References Cited

U.S. PATENT DOCUMENTS 3,768,273  10/1973  Missimer ................................. 62/84
5,337,572   8/1994  Longsworth ............................ 62/51.2

OTHER PUBLICATIONS

Arkharov, A., Marfenina, I., and Mikulin, Ye., *Theory and Design of Cryogenic Systems*, MIR publishers, Moscow, 1981, pp. 232–233.

Chan, C. K., Closed Cycle Joule Thompson Refrigerator Using Gas Mixtures, *Proceedings of Interagency Cryocooler Meeting on Cryocoolers*, 1988, p. 121.

Kleemenko, A. P., One Flow Cascade Cycle, *Proceedings of the Xth International Congress on Refrigeration*, Copenhagen, 1, 34–39, Pergamon Press, London, 1959.

Little, W. A., Recent Developments in Joule–Thompson Cooling: Gases, Coolers and Compressors, *Proceedings of the 5th Cryocooler Conference*, Monterey, 1988.

Little, William A, Advances in Joule–Thompson Cooling, *Advances in Cryogenic Engineering*, vol. 35, Plenum Press, New York, 1990, pp. 1305–1314.

*Primary Examiner*—Emanuel T. Voeltz
*Assistant Examiner*—Tony M. Cole
*Attorney, Agent, or Firm*—Lumen Intellectual Property Services

[57] ABSTRACT

A method is disclosed for maximizing the thermodynamic efficiency and the heat transfer capacity of a counter-current heat exchanger through the use of an optimized multi-component working fluid. Given the operational temperatures and pressures of the heat exchanger, the disclosure teaches a method for selecting the components for the working fluid and for determining the molar fractions of the components that determine the optimal mixture for the working fluid. Because the effective specific heat of a high pressure stream of this mixture is equal to the effective specific heat of a low pressure stream throughout the entire temperature range of the heat exchanger, the thermodynamic efficiency of the heat exchange process is maximized. In addition, because the difference between the enthalpies per unit mass of the two streams are maximized throughout the temperature range of the exchanger, this mixture provides optimal capacity for heat transfer in the heat exchanger. Such an optimal working fluid can dramatically improve the performance of a heat engine or heat pump, and is especially effective in cryogenic refrigeration systems.

10 Claims, 5 Drawing Sheets

METHOD FOR EFFICIENT COUNTER-CURRENT HEAT EXCHANGE USING OPTIMIZED MIXTURES

This invention was reduced to practice with Government support under the Department of Navy Contract N00014-94-C-2164, awarded by ARPA. The Government has certain rights in the invention.

FIELD OF THE INVENTION

This invention relates to heat exchangers and methods for optimizing their performance. In particular, it relates to the use of working fluids that have maximal capacity for heat transfer and that maximize the thermodynamic efficiency of heat exchangers such as those used in heat engines and heat pumps, and especially in cryogenic refrigeration systems.

BACKGROUND OF THE INVENTION

Counter-current heat exchangers are important elements of many heat engines and heat pumps. Typically, a counter-current heat exchanger is used in such systems to transfer heat from a stream of working fluid at one pressure to a stream at another pressure. In many refrigeration systems, for example, a warm stream coming from a compressor and a cold stream returning to the compressor pass through a heat exchanger in opposite directions. The warm stream gradually cools as it flows along the length of the exchanger due to its loss of heat to the cooler returning stream.

The efficiency of heat engines and heat pumps is limited largely by the degree of thermodynamic irreversibility in the heat transfer process of their counter-current heat exchangers. For example, in refrigeration systems using a single-component refrigerant, the heat capacity of the refrigerant may change significantly as its temperature and pressure changes. Consequently, as heat is transferred between the streams along the length of the heat exchanger, the temperature change of the high-pressure stream will be different from the temperature change of the low-pressure stream, causing the temperatures of the streams to diverge at one end of the heat exchanger. Since the degree of irreversibility of a heat exchange process increases as the temperature difference increases, this temperature divergence significantly increases the inefficiency of the refrigerator. More generally, in any heat pump or heat engine having a counter-current heat exchanger, the variation in the heat capacity of its working fluid imposes a theoretical limitation on its efficiency.

It is now known that these limitations on the efficiency of counter-current heat exchange processes can be minimized in theory by using multi-component working fluids. Components of the working fluid and their relative fractions can be chosen, in principle, so that the heat capacity of the working fluid at high pressure is equal to its heat capacity at low pressure over the entire temperature range of the heat exchanger. Consequently, the temperature difference between the two fluids will remain constant throughout the length of the heat exchanger and the efficiency of the system will be maximized.

The effective heat capacity of such a multi-component working fluid is defined as $(dH/dT)_P$, that is, the change in enthalpy of the mixture per unit change in temperature at constant pressure. Because the heat exchange between the high and low pressure streams may cause the components of the working fluid to change phase, the effective heat capacity of the mixture includes both contributions due to the heat capacities of the individual phases present in the mixture and contributions due to changes of phase in the mixture. In the following discussion, the effective heat capacity of a mixture is often referred to as simply the heat capacity of the mixture.

The first to recognize the theoretical possibility of maximizing heat-exchange efficiency through the use of multi-component working fluids was A. P. Kleemenko in his studies of single-stream, throttle-expansion cycle cryogenic refrigeration systems described in "One Flow Cascade Cycle," Proceedings of the Xth International Congress on Refrigeration, Copenhagen, 1, 34–39, (1959), Pergamon Press, London. It has subsequently been referred to in recent texts on cryogenic systems, such as "Theory and Design of Cryogenic Systems" by A. Arkjarov, I. Marfenina and Ye. Mikulin, Mir Publishers, Moscow (1981).

In the course of attempts to realize this theoretical possibility in cryogenic refrigeration systems, some specific mixed-gas refrigerants have been found that provide some improved refrigeration efficiency. Most notable are those refrigerant mixtures containing a mixture of nitrogen with some of the lighter hydrocarbon gases, such as methane, ethane, propane, and iso-butane. Similar mixtures containing, in addition, some of the Freons have been described by Alfeev, Brodyansky, Yagodin, Nikolsky & Ivantsov, British Patent 1,336,892 (1973); W. A. Little, Proceedings of the 5th Cryocooler Conference, Monterey, (1988); W. A. Little, Advances in Cryogenic Engineering, 1305–1314 (1990); C. K. Chan, Proceedings of Interagency Cryocooler Meeting on Cryocoolers, p.121 (1988), and R. Longsworth, U.S. Pat. No. 5,337,572 (1994). In comparison with single-component refrigerants, these refrigerant mixtures have smaller differences between the heat capacities of their high and low pressure streams over the wide temperature range needed for cryogenic operation. Consequently, they reduce the thermodynamic irreversibility in the heat exchange processes and improve the refrigeration efficiency.

The mixtures described in the prior art, however, still fall short of producing the maximum possible refrigeration efficiency. Since there are significant differences in the heat capacities of their low and high pressure streams, these mixtures—just like the single-component refrigerants—produce a temperature divergence in the counter-current heat exchanger. This divergence, in turn, increases the irreversibility and inefficiency of the heat-exchange process. Thus, in spite of the fact that many specific refrigeration mixtures have been proposed and used for obtaining improved efficiency, none comes close to obtaining the maximum possible efficiency.

In addition to thermodynamic efficiency, the performance of heat exchange processes is also determined in large part by the heat transfer capacity of the mixture over the operational temperature range. The difference in enthalpy between the high and low pressure streams determines the amount of heat that can be transferred between them. In order to provide refrigeration at cryogenic temperatures, for example, it is crucial that the heat transfer capacity of the mixture be significant over the entire operational temperature range. Many of the mixtures in the prior art, however, have increasingly reduced refrigeration capacity at lower temperatures. Consequently, the refrigerator performance with these mixtures decreases dramatically at low temperatures, and eventually reaches a low-temperature limit below which the mixture is unable to provide any refrigeration.

An attempt to develop a procedure for the optimization of refrigeration mixtures is described in Gorbachov, et al, "High Temperature Superconductivity", All-Union Scientific and Research Institute for Interdisciplinary Information, Vol. 3–4, Moscow (1990), p. 3–7, and in Boyarsky et al, "Properties of Cryogenic Systems working on Mixtures," Moscow Institute of Energy, Moscow (1990). This article proposes a complicated algorithm for the selection of the refrigerant mixture, based on the properties of the pure components. This procedure, however, is intended to yield a mixture with optimized refrigeration capacity, and it does not present a condition for optimizing refrigeration efficiency, i.e., for ensuring equality of the heat capacities of the two streams.

The prior art, therefore, does not teach any general procedure by which the composition of a refrigerant mixture can be adjusted or selected to produce a refrigeration system with both optimum thermodynamic efficiency and optimum refrigeration capacity. Thus, in spite of the fact that it has been theoretically possible and highly desirable since Kleemenko's discovery in 1959 to produce a maximally efficient refrigeration system through the use of a multiple-component mixture, the practical realization of such a highly efficient refrigerator has continued to elude researchers. In addition, no prior art provides a general or particular method for producing a heat engine or heat pump of any kind whose counter-current heat exchanger obtains or approaches minimal irreversibility through the use of an appropriately chosen refrigerant mixture.

OBJECTS AND ADVANTAGES OF THE INVENTION

In view of the above, it is a primary object of the present invention to provide a counter-current heat exchanger with a working fluid mixture that both maximizes the heat transfer process in the heat exchanger and minimizes the thermodynamic irreversibility of the heat exchange process. It is another object of the invention to provide refrigeration mixtures with maximal refrigeration capacities and maximal thermodynamic efficiency over a wide temperature range extending down to cryogenic temperatures. It is an additional object of the invention to provide a closed-cycle thermodynamic system that obtains maximal efficiency by minimizing the irreversibility of its counter-current heat-exchange process through appropriate selection of its working fluid. It is also an object of the invention to provide a general method for producing a working fluid mixture for use in a counter-current heat-exchanger within a closed-cycle thermodynamic system having predetermined operating conditions, such that the fluid will minimize the irreversibility of the heat exchange process and will have maximal heat exchange capacity.

Minimizing the irreversibility of counter-current heat-exchange processes in heat pumps allows them to produce the same amount of refrigeration or heating with less energy. More efficient refrigeration, for example, reduces the energy wasted in refrigerators and allows the same refrigeration to be performed with less powerful and less expensive compressors. Minimizing the irreversibility of counter-current heat-exchange processes in heat engines allows them to produce more energy from the same amount of heat. The great advantages and implications of these improvements are obvious.

SUMMARY OF THE INVENTION

The present invention provides a method of counter-current heat exchange with minimized thermodynamic irreversibility and maximized heat exchange capacity. The irreversibility of the heat-exchange process is minimized by the use of an optimal working fluid whose high and low pressure streams have the same heat capacity over the entire temperature range of the heat exchanger. Consequently, the temperatures of the two streams along the length of the heat exchanger do not diverge, and the irreversibility is kept to a minimum. In addition, the optimal working fluid has maximal capacity for transferring heat, further increasing the performance of the system.

The method for producing the optimal working fluid includes a novel procedure by which its components and their relative fractions are determined from predetermined operational temperatures and pressures of the heat exchanger. First, several components are chosen for the working fluid such that their boiling points are distributed throughout a temperature range including the operational temperature range. Initial molar fractions for the components are selected and these determine a particular mixture. The variance across the operational temperature range of the absolute difference between the effective enthalpy per unit mass of the mixture at high pressure and the mixture at low pressure is then calculated. In addition, the smallest absolute difference across the operational temperature range between the enthalpy per unit mass at the high pressure and that at the low pressure is calculated. The molar fractions are then adjusted to reduce the calculated variance and increase the calculated smallest absolute difference. Iteration of these steps produces the molar fractions required to produce the optimal working fluid. Efficient heat exchange is obtained by using this optimized working fluid in a counter-current heat exchanger, such as in a heat pump or heat engine.

DETAILED DESCRIPTION

Although the invention applies to any closed-cycle thermodynamic system involving a counter-current heat exchanger, for the sake of definiteness the following description illustrates the invention as it applies to a simple closed-cycle refrigeration system.

Refrigeration systems described in the prior art have failed to obtain optimal efficiency over a wide temperature range because of the difficulties in understanding multi-component refrigerants. The following description teaches methods for selecting mixtures that have maximal refrigeration capacity and that minimize the thermodynamic irreversibility in the heat exchangers through which they flow.

Figure 1A:
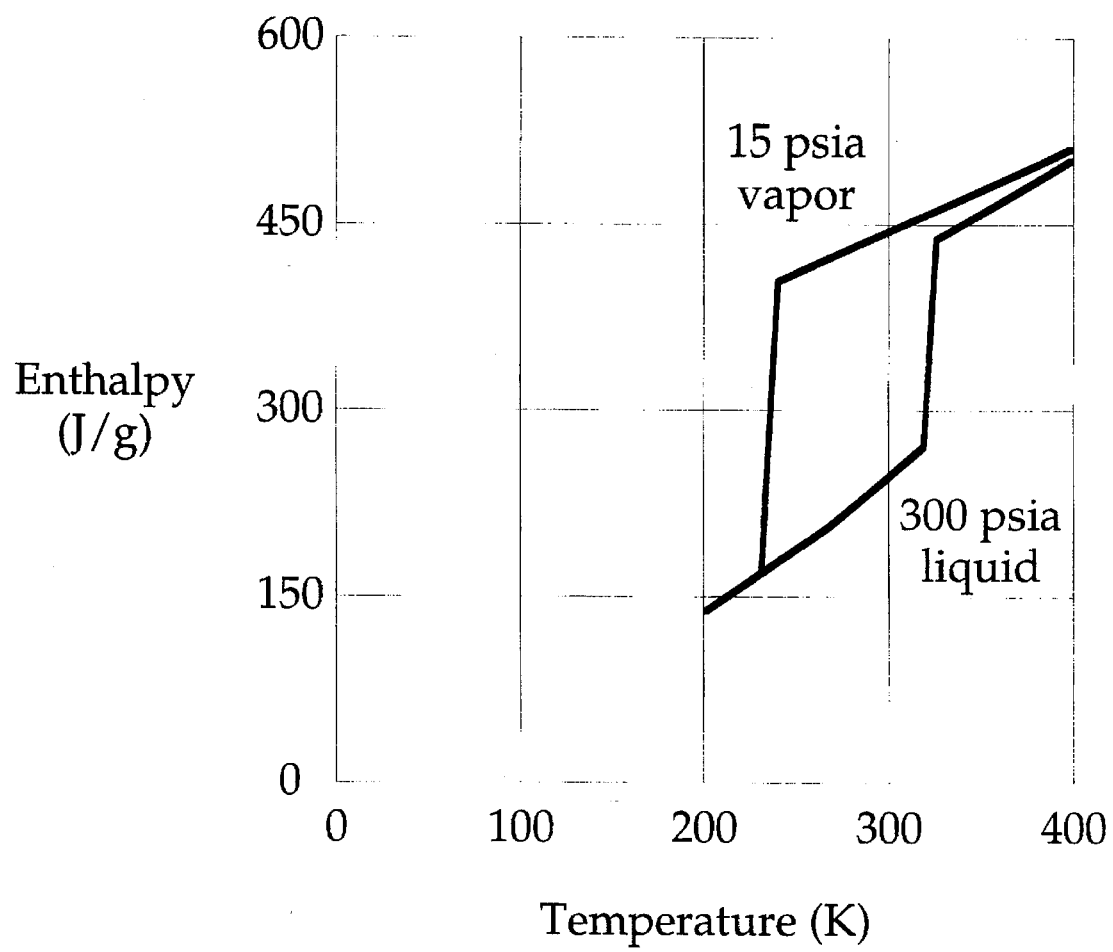
FIG. 1a shows the H vs. T graph of a single component refrigerant used in the prior art.

FIG. 1a shows the H vs. T (enthalpy per unit mass vs. temperature) graph for R22 (chlorodifluoromethane), a typical single-component refrigerant. The lower curve corresponds to the high-pressure (300 psia) liquid stream as it flows along the length of the heat exchanger, while the upper curve corresponds to the low-pressure (15 psia) vapor stream. Note that although the pressure of each stream may vary by as much as 25% along the length of the exchanger, this variation is small in comparison with the pressures difference between the high and low pressure streams.

Since the vertical spacing between the high and low pressure H vs. T curves measures the enthalpy difference between the two streams, a larger spacing between the curves corresponds to a larger refrigeration capacity. As FIG. 1a shows, the refrigeration capacity of this refrigerant is large only within the 80 K temperature range from 240 K to 320 K. In particular, below 230 K the refrigeration capacity suddenly drops to zero and the refrigerant is incapable of providing any heat transfer between the two streams.

Since the slope of an H vs. T curve represents the effective heat capacity, the difference in slopes of the high and low pressure curves indicates the difference in effective heat capacity. Recall that any differences in the heat capacities of the two streams cause their temperatures to diverge, resulting in reduced thermodynamic efficiency. It is evident from the differing slopes of the two curves in FIG. 1a, therefore, that this single component working fluid will result in inefficient heat exchange. In short, this refrigerant can not produce refrigeration at cryogenic temperatures and the refrigeration it can produce at higher temperatures is inefficient.

Figure 1B:
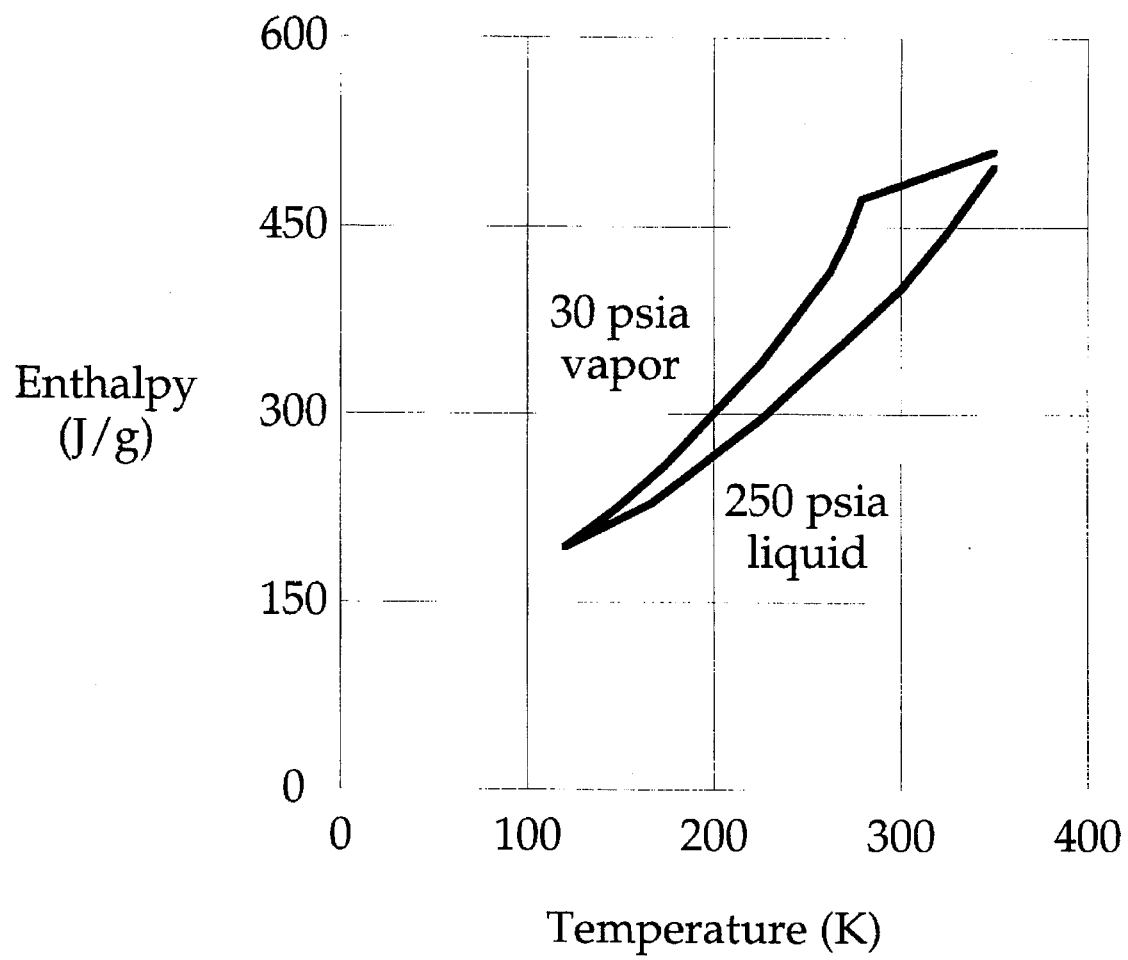
FIG. 1b shows the H vs. T graph of a multiple component refrigerant used in the prior art.

FIG. 1b shows the H vs. T curves for a typical refrigerant mixture described in the prior art (U.S. Pat. No. 3,768,273 granted to Missimer Oct. 30, 1973). This mixture was designed for refrigeration down to 130 K and consists of the following components and their respective molar fractions:

| 22.5% | R-11  | (trichlorofluoromethane) |
|-------|-------|--------------------------|
| 29.8% | R-12  | (dichlorodifluoromethane) |
| 16.4% | R-13  | (chlorotrifluoromethane) |
| 16.3% | R-14  | (tetrafluoromethane) |
| 15.0% | R-740 | (argon) |

The lower curve in FIG. 1b corresponds to the mixture at high pressure (250 psia) and the upper curve corresponds to the mixture at low pressure (30 psia). In contrast with the single component mixture which has an 80 K temperature range, this multi-component mixture provides refrigeration capacity over the 180 K temperature range where the two curves have significant vertical separation. Although the refrigeration capacity of this mixture remains nonzero at temperatures far below that of the single component refrigerant, below 160 K the two curves converge and the refrigeration capacity becomes very small. At 120 K the curves meet at a point of constriction and the refrigerant can no longer transfer any heat at all between the streams.

The performance of this refrigerant mixture is reduced further by the difference between the effective heat capacities of the two streams. Although the two curves in FIG. 1b run more parallel to each other over a wider temperature range than those in FIG. 1a, their slopes are still significantly different. Consequently, the effective heat capacities of the high and low pressure streams are not equal along the length of the heat exchanger and the resulting temperature divergence reduces the efficiency of the refrigerator. Thus, although Missimer's mixture is more efficient than the single-component refrigerant, it nevertheless falls short of optimal efficiency.

The above analysis provides novel insight relating the H vs. T curve of a working fluid to its degree of thermodynamic efficiency and refrigeration capacity. In particular, it teaches that the ideal refrigerant mixture satisfies the following two conditions. First, it satisfies the condition that the H vs. T curves have equal slopes at equal temperatures throughout the temperature range from one end of the exchanger to the other. In accordance with the above analysis, this condition is equivalent to the condition that the heat capacities of the high and low pressure streams are equal along the entire length of the heat exchanger. Consequently, the irreversibility of the heat exchange process is minimized and the refrigeration is efficient. The ideal refrigerant mixture also satisfies the condition that the H vs. T curves for the high and low pressure streams are well separated throughout the temperature range of the heat exchanger. This condition will ensure that the mixture has a maximal refrigeration capacity.

Accordingly, the inventor has developed the following procedure for producing an ideal refrigeration mixture for use in a refrigeration system having predetermined operating temperatures and pressures. Let $T_1$ and $P_1$ be the temperature and pressure, respectively, of the high-pressure stream entering the heat exchanger, and let $T_2$ and $P_2$ be the temperature and pressure, respectively, of the low-pressure stream entering the opposite end of the heat exchanger. Let $x_1, \ldots, x_n$ be the molar fractions of a mixture composed of n components. Define the function $$Q(x_1, \ldots, x_n) = \frac{\Delta H_{min}}{|c| + \text{Variance}(\Delta H)},$$

where c is a constant, $\Delta H_{min}$ is the enthalpy difference between the curves at the point of closest approach within the temperature range from $T_1$ to $T_2$, and where Variance ($\Delta H$) measures the variance of the enthalpy difference between the two curves throughout the temperature range from $T_1$ to $T_2$.

Since Variance($\Delta H$) is a minimum if and only if the curves are equally spaced, and since $\Delta H_{min}$ is maximized if and only if the two curves are maximally separated, a working fluid mixture has high efficiency and high refrigeration capacity if and only if the quantity Q is maximized. Therefore, to determine the optimal refrigeration mixture, it suffices to find the molar fractions, $x_1, \ldots, x_n$, of the components such that the resulting mixture maximizes Q. The evaluation of Q at $x_1, \ldots, x_n$ can be performed with assistance from one of severally commercially available computer programs for calculating the enthalpy of mixtures at specified temperatures and pressures. Suitable programs are DDMIX, REFPROP and STRAPP. These programs are available from the National Institute of Standards and Technology, Gaithersburg, Md. or from independent suppliers such as Cryodata, Inc., Niwot, Colo.

The method for maximizing Q is described below in an example illustrating the details of the mixture optimization method. Since a larger number of variables $x_1, \ldots, x_n$ permits a larger maximum for Q, it is preferable to design mixtures with five or more components. Using many components also has the additional advantage that lower refrigeration temperatures can be obtained through surprising synergistic effects between the components. More specifically, such a mixture can retain all the components in solution (and hence avoid clogging of the refrigeration system) at temperatures below the triple point of several of the components since (1) a mixture of many different components is generally a better solvent than the single components alone are, and (2) the concentration of any one component is always relatively small in a mixture of many components. For example, the eight-component mixture of R-14, R-23, R-134a, R-123, $N_2$, Ar, propane, and n-butane described below can provide refrigeration down to 125 K in a single-stream, throttle-expansion refrigeration cycle in spite of the fact that the triple points of n-butane, R-134a, and R-123 (240 K, 171 K, and 166 K, respectively) are well above 125 K.

The above method for producing an optimal working fluid is now illustrated in the case of a single-stream throttle-expansion-cycle cryogenic refrigeration system. A low pressure, $P_1$, of 2 to 3 bars and a high pressure, $P_2$, of 14 to 20 bars has-been found to be optimum for most small oil-lubricated compressors from 0.1 to 1.0 horse-power. At these pressures the amount of work done compressing the fluid and delivering it to the output reaches a maximum compared to the amount dissipated in electrical losses and friction. A high temperature, $T_1$, of 5° C. to 10° C. above the ambient temperature of the operating environment allows efficient heat removal by the condenser. To reach cryogenic temperatures, a low temperature, $T_2$, of 150° C. to 200° C. below ambient temperature is chosen. Accordingly, the following example illustrates the design of a mixture for use in a refrigeration system having predetermined operating temperatures $T_1$=300 K and $T_2$=150 K, and predetermined operating pressures $P_1$=2 bar and $P_2$=17 bar.

The operating temperature range determines the choice of components for the refrigeration mixture. A first component is chosen to have a normal boiling point 5° C. to 10° C. below $T_1$, a second component is chosen to have a normal boiling point 50° C. to 60° C. below $T_2$, and a third component is chosen to have a normal boiling point roughly half way between that of the first and second components. In this example, the first refrigerant component is R-123 having a normal boiling point of 301 K, the second is Ar having a normal boiling point of 87 K, and the third is R-23 with an intermediate boiling point of 191 K.

Figure 2A:
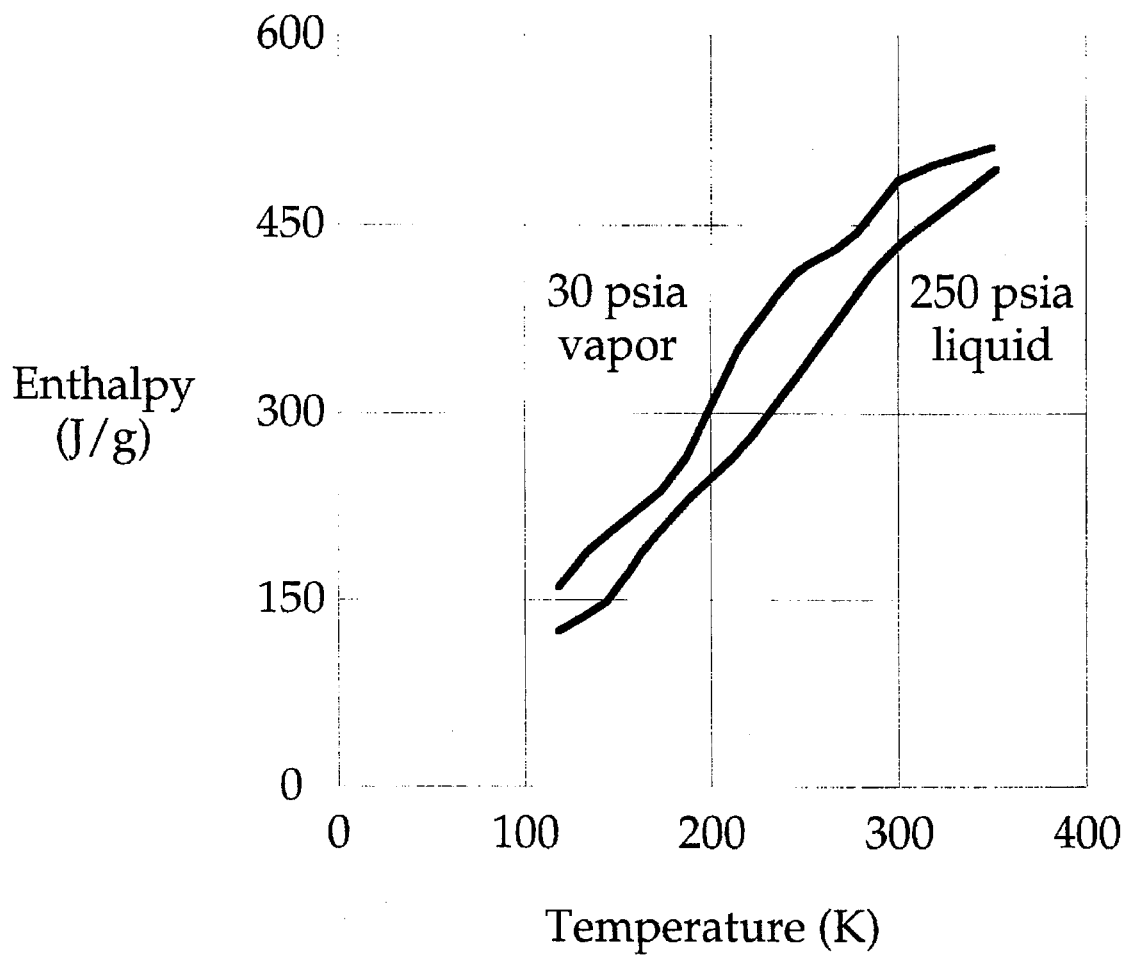
FIG. 2a shows the H vs. T graph of an intermediate three-component mixture chosen in accordance with the method of the invention for refrigeration down to 150 K in 300 K ambient.
Figure 2B:
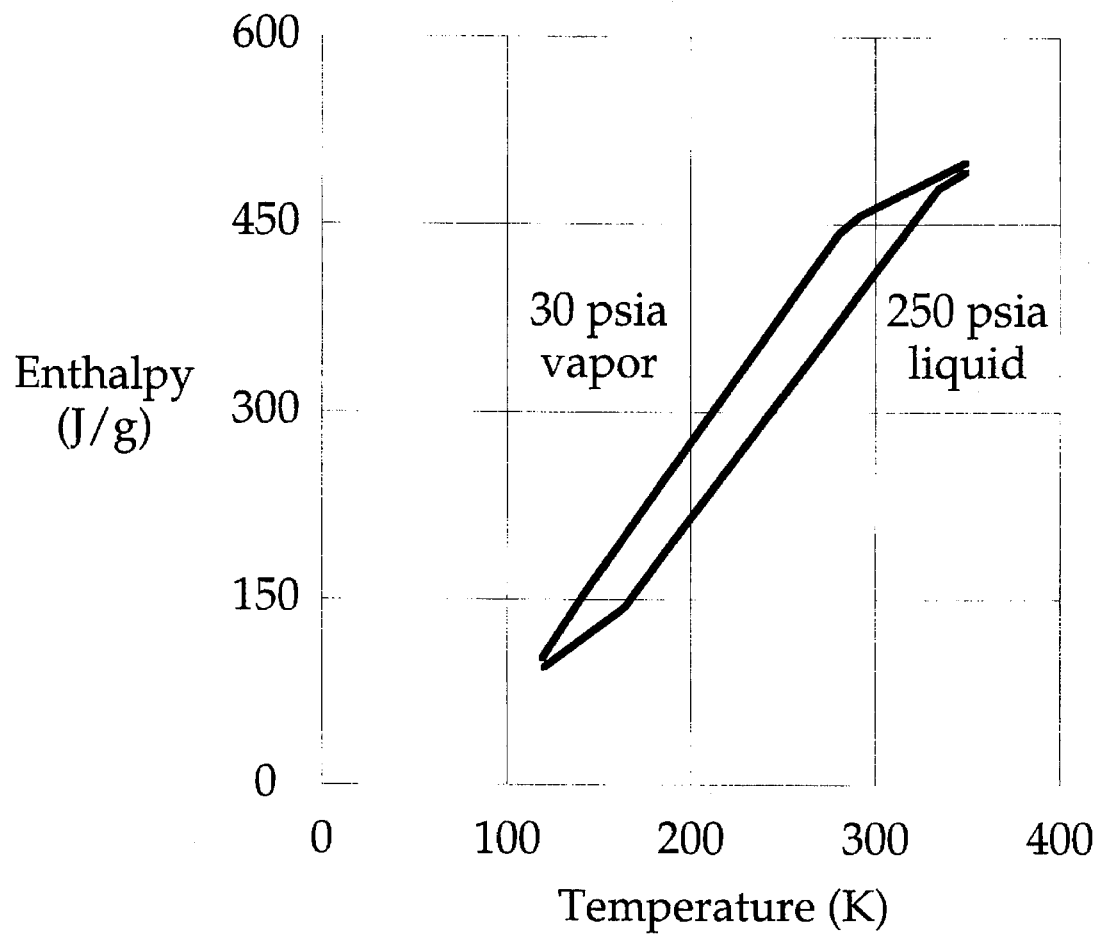
FIG. 2b shows the H vs. T graph of an intermediate five-component mixture chosen in accordance with the method of the invention for refrigeration down to 150 K in 300 K ambient.

The H vs. T graph for an equal mixture of these components will have two points of constriction where the high and low pressure curves come close to each other. The graph for an equal mixture of R-123, R-23, and Ar is shown in FIG. 2a and indicates these constrictions at 175 K and at 275 K. In order to reduce these constrictions, a fourth component is chosen to have a normal boiling point 25° C. to 30° C. below one of these points of constriction, and a fifth component is chosen to have a normal boiling point 25° C. to 30° C. below the other point of constriction. In this example, the fourth component chosen is R-14 having a boiling point of 145 K and the fifth component chosen is R-134a having a boiling point of 246 K. FIG. 2b shows the H vs. T graph for an equal mixture of these five components. Note that the high and low pressure curves for this mixture are very close to equally spaced and well-separated throughout a large temperature range. Nevertheless, the points of constriction at 120 K and 350 K will reduce the performance of the mixture. Accordingly, additional components are added. In this example, propane, n-butane, and nitrogen are added.

Once the components have been chosen, their molar fractions $x_1, \ldots, x_n$ are adjusted to maximize the function Q and thereby determine the optimal mixture. There are many well-known numerical methods for maximizing a function of several variables. For example, one such method involves calculating the numerical derivatives $$\frac{Q(x_1+\Delta x, \ldots, x_n)}{\Delta x}, \ldots, \frac{Q(x_1, \ldots, x_n+\Delta x)}{\Delta x}$$

for a small perturbation $\Delta x$, normalizing the molar composition to unity (so $x_1+\ldots+x_n=1$), and then shifting each value of $x_1, \ldots, x_n$ by an amount proportional to its corresponding derivative. This process is repeated until the values for $x_1, \ldots, x_n$ fluctuate around a single set of values. This set corresponds to the maximum value of Q. If desired, the process is repeated with a reduced value of $\Delta x$ in order to more accurately determine the maximum.

Using the above five components as a starting point, and the program STRAPP to calculate values for Q, the above procedure for maximizing Q determined the following optimal mixture of these eight components over the temperature range from 150 K to 300 K:

| | | |
|---|---|---|
| 14.5% | R-23 | (trifluoromethane) |
| 14.1% | R-123 | (HCFC-123) |
| 11.9% | Ar | (argon) |
| 13.9% | R-134a | ($CF_3CH_2F$) |
| 18.0% | R-14 | (tetrafluoromethane) |
| 13.4% | C-4 | (n-butane) |
| 6.8% | C-3 | (propane) |
| 7.4% | $N_2$ | (nitrogen) |

Figure 2C:
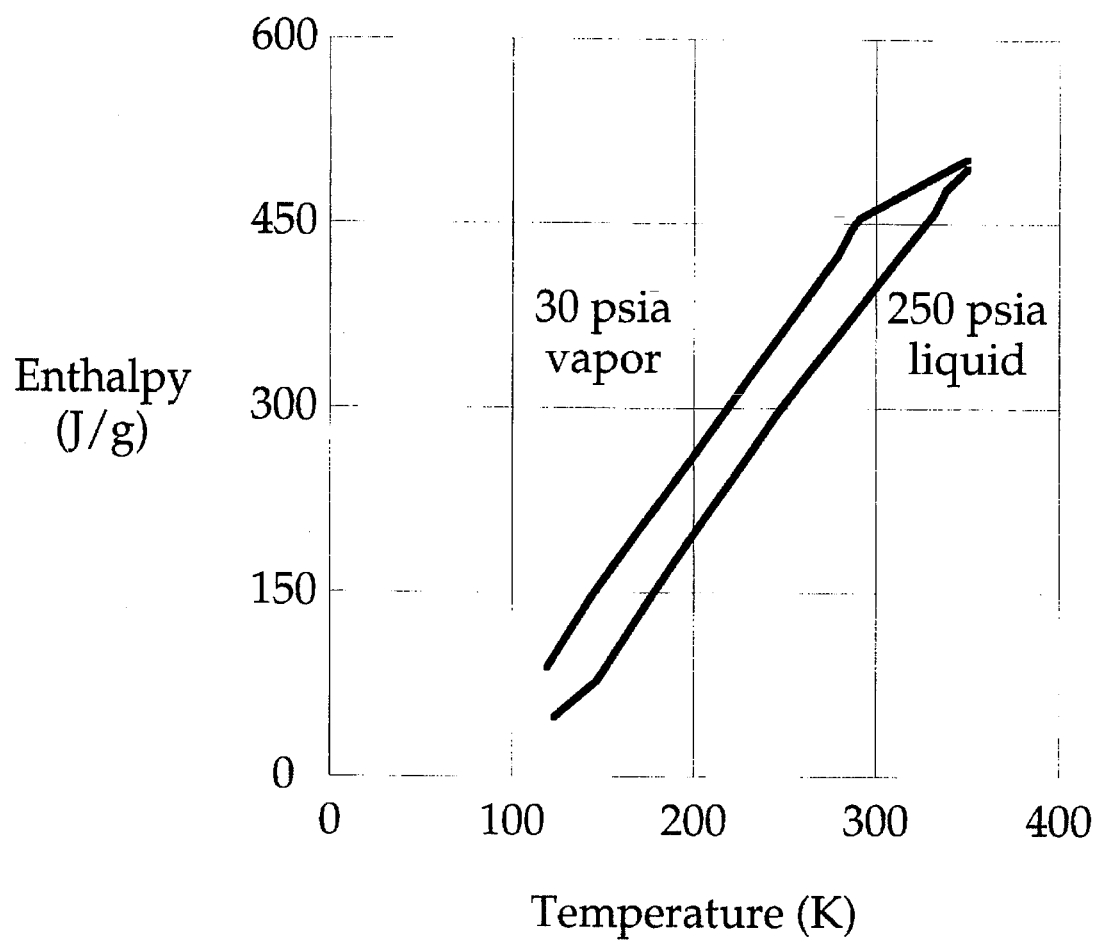
FIG. 2c shows the H vs. T graph of an optimized eight-component mixture chosen in accordance with the method of the invention.

The H vs. T graph for this optimal mixture is shown in FIG. 2c. As the equal spacing and substantial separation between the two curves indicates, this mixture is extremely efficient and provides excellent refrigeration capacity over the entire range of optimization. Moreover, although the efficiency decreases slightly below 140 K, this mixture still performs better than mixtures in the prior art at temperatures down to and below 120 K. A comparison of this graph with the corresponding graphs for mixtures found in the prior art clearly demonstrates that this method for designing mixtures yields working fluids capable of producing heat exchange with unprecedented thermodynamic efficiency over very large temperature ranges.

RAMIFICATIONS AND SCOPE

Although the above description contains many specifics, it is intended merely as an illustration of how the disclosed method may be implemented. Many variations are possible. For example, the method is not limited to the design of refrigerants, but may be used to design working fluids for heat exchangers in heat engines and other types of heat pumps.

The specific operating temperatures and pressures used in the above description were for illustration purposes only; anyone skilled in the art will immediately recognize that these operational parameters may be continuously varied to produce optimal working fluids for use in any other heat exchanger. Similarly, the specific components used in the illustrative example may be altered or changed in accordance with the teachings of the invention to produce optimal working fluids for use under various different operating conditions.

Anyone skilled in the art will recognize that the particular definition of Q given above is not unique. Many variations in the specific formula for Q will still result in an optimal working fluid when Q is maximized. In general, Q can be any function of the component fractions that is maximized if and only if the high and low pressure curves in the H vs. T graph are equally spaced and maximally separated. Alternatively, a function can be constructed such that its minimization will optimize the working fluid.

The optimization procedure also may be applied to counter-current heat exchangers through which two streams of different composition flow. For example, one of the two streams may correspond to a fluid from which one or more components have been separated, such as in a multi-stage refrigeration system. Alternatively, one of the streams may have a different composition altogether, such as in a multi-cycle system. The optimization procedure also applies to the case where large variations in pressure exist in one or both streams along the length of the heat exchanger. In general, in any case where the H vs. T curves of the two streams may be calculated, the method can be applied to optimize the composition of the fluid or fluids to minimize the thermodynamic irreversibility in the heat-exchange process.

In view of these and other possible variations, the scope of the invention should not be determined by the details of the above description, but by the following claims and their legal equivalents.

I claim:

1. A method for producing an optimal working fluid for maximizing over a predetermined operational temperature range the efficiency of a counter-current heat exchange process between a stream of the working fluid at a high pressure and a stream of the working fluid at low pressure, the method comprising:

choosing a number n of working fluid components such that their normal boiling points are distributed throughout a temperature range including the operational temperature range;

selecting molar fractions, $x_1, \ldots, x_n$, for the n components which determine a mixture of components;

calculating the variance across the operational temperature range of the absolute difference between the enthalpy per unit mass of the mixture at the high pressure and the enthalpy per unit mass of the mixture at the low pressure;

calculating the smallest absolute difference across the operational temperature range between the enthalpy per unit mass at the high pressure and the enthalpy per unit mass at the low pressure;

adjusting the molar fractions for the n components such that the calculated variance is reduced and such that the calculated smallest absolute difference is maximized; and combining the components according to the adjusted molar fractions to form the optimal working fluid;

whereby the working fluid minimizes the irreversibility of the heat exchange process and maximizes the heat exchange capacity of the heat exchange process.

2. The method of claim 1 further comprising calculating the value of a function substantially equivalent to $$Q(x_1, \ldots, x_n) = \frac{\Delta H_{min}}{|c| + \text{Variance}(\Delta H)},$$

where c is a constant, $\Delta H_{min}$ is the smallest absolute difference across the operational temperature range between the enthalpy per unit mass at the high pressure and the enthalpy per unit mass at the low pressure, and where Variance($\Delta H$) is the variance across the operational temperature range of the absolute difference between the enthalpy per unit mass of the mixture at the high pressure and the enthalpy per unit mass of the mixture at the low pressure.

3. A method for producing an optimal working fluid for maximizing over a predetermined operational temperature range the efficiency of a counter-current heat exchange process between a stream of the working fluid at a high pressure and a stream of the working fluid at low pressure, the method comprising:

choosing a number n of working fluid components such that their normal boiling points are distributed throughout a temperature range including the operational temperature range;

selecting molar fractions, $x_1, \ldots, x_n$, for the n components which determine a mixture of components;

calculating the variance across the operational temperature range of the absolute difference between the enthalpy per unit mass of the mixture at the high pressure and the enthalpy per unit mass of the mixture at the low pressure;

adjusting the molar fractions for the n components such that the calculated variance is reduced; and combining the components according to the adjusted molar fractions to form the optimal working fluid;

wherein:

the predetermined operational temperature range is substantially equal to the range 150 K to 300 K;

the low pressure is substantially equal to 2 bar;

the high pressure is substantially equal to 17 bar; and the optimal working fluid comprises the eight components R-23 (trifluoromethane), R-123 (HCFC-123), Ar (argon), R-134a ($CF_3CH_2F$), R-14 (tetrafluoromethane), C-4 (n-butane), C-3 (propane), and $N_2$ (nitrogen), in respective molar fractions substantially equal to 14.5%, 14.1%, 11.9%, 13.9%, 18.0%, 13.4%, 6.8%, and 7.4%;

whereby the working fluid minimizes the irreversibility of the heat exchange process.

4. A thermodynamic system characterized by a predetermined operational temperature range, a predetermined high pressure, and a predetermined low pressure, the system comprising:

a working fluid comprising n components, where the molar fractions $x_1, \ldots, x_n$ of the n components are selected such that the variance across the operational temperature range of the absolute difference between the enthalpy per unit mass of the fluid at the high pressure and the enthalpy per unit mass of the fluid at the low pressure is minimized and such that the smallest absolute difference across the operational temperature range between the enthalpy per unit mass at the high pressure and the enthalpy per unit mass at the low pressure is maximized; and a heat exchanger into which a stream of the working fluid enters at the high pressure, and into which a stream of the working fluid enters at low pressure in counter-current relationship with the high-pressure stream.

5. The system of claim 4 wherein the predetermined operational temperature range is substantially equal to the range 150 K to 300 K;

the low pressure is substantially equal to 2 bar;

the high pressure is substantially equal to 17 bar; and the working fluid comprises the eight components R-23 (trifluoromethane), R-123 (HCFC-123), Ar (argon), R-134a ($CF_3CH_2F$), R-14 (tetrafluoromethane), C-4 (n-butane), C-3 (propane), and $N_2$ (nitrogen), in respective molar fractions substantially equal to 14.5%, 14.1%, 11.9%, 13.9%, 18.0%, 13.4%, 6.8%, and 7.4%.

6. The system of claim 4 wherein the system is a refrigerator.

7. The system of claim 4 wherein the system is a heat engine.

8. An optimal working fluid for use in a counter-current heat exchanger characterized by a predetermined operational temperature range, a predetermined high pressure, and a predetermined low pressure, the optimal working fluid comprising n components having molar fractions $x_1, \ldots, x_n$, where the molar fractions are selected such that the variance across the operational temperature range of the absolute difference between the enthalpy per unit mass of the fluid at the high pressure and the enthalpy per unit mass of the fluid at the low pressure is minimized and such that the smallest absolute difference across the operational temperature range between the enthalpy per unit mass at the high pressure and the enthalpy per unit mass at the low pressure is maximized.

9. The optimal working fluid of claim 8 wherein the predetermined operational temperature range is substantially equal to the range 150 K to 300 K;

the predetermined low pressure is substantially equal to 2 bar;

the predetermined high pressure is substantially equal to 17 bar; and the working fluid comprises the eight components R-23 (trifluoromethane), R-123 (HCFC-123), Ar (argon), R-134a ($CF_3CH_2F$), R-14 (tetrafluoromethane), C-4 (n-butane), C-3 (propane), and $N_2$ (nitrogen), in respective molar fractions substantially equal to 14.5%, 14.1%, 11.9%, 13.9%, 18.0%, 13.4%, 6.8%, and 7.4%.

10. The optimal working fluid of claim 8 wherein the number n of working fluid components is chosen to be greater than four, whereby the solubility of the components is enhanced and the irreversibility of the heat exchange process is further minimized.

* * * * *